(12) United States Patent
Inagaki et al.

(10) Patent No.: US 9,758,194 B2
(45) Date of Patent: Sep. 12, 2017

(54) VEHICLE REAR PORTION STRUCTURE

(71) Applicant: TOYOTA JIDOSHA KABUSHIKI KAISHA, Toyota-shi, Aichi (JP)

(72) Inventors: Yudai Inagaki, Toyota (JP); Osamu Shimasaki, Nissin (JP); Kenichiro Yoshimoto, Tokai (JP); Kazunori Yokoe, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/022,335

(22) PCT Filed: Sep. 8, 2014

(86) PCT No.: PCT/JP2014/073713
§ 371 (c)(1),
(2) Date: Mar. 16, 2016

(87) PCT Pub. No.: WO2015/045836
PCT Pub. Date: Apr. 2, 2015

(65) Prior Publication Data
US 2016/0297483 A1  Oct. 13, 2016

(30) Foreign Application Priority Data

Sep. 25, 2013 (JP) .................. 2013-198543

(51) Int. Cl.
*B62D 25/08* (2006.01)
*B60K 1/04* (2006.01)
*B62D 21/03* (2006.01)

(52) U.S. Cl.
CPC ............. *B62D 25/08* (2013.01); *B60K 1/04* (2013.01); *B62D 21/03* (2013.01); *B62D 25/087* (2013.01); *B60K 2001/0416* (2013.01)

(58) Field of Classification Search
CPC .. B60K 1/04; B60K 2001/0416; B62D 21/03; B62D 25/08; B62D 25/087
See application file for complete search history.

(56) References Cited

U.S. PATENT DOCUMENTS 4,950,025 A * 8/1990 Yoshii ................. B62D 25/087
296/203.04
6,010,181 A * 1/2000 Robbins ............... B60G 15/063
296/203.01

(Continued)

FOREIGN PATENT DOCUMENTS

DE   EP 1612127 A2 *  1/2006  ............. B60R 5/04
DE   102013012132 A1 * 1/2014  ........... B62D 25/087

(Continued)

*Primary Examiner* — Glenn Dayoan
*Assistant Examiner* — Paul Chenevert
(74) *Attorney, Agent, or Firm* — Andrews Kurth Kenyon LLP

(57) ABSTRACT

There is provided a vehicle rear portion structure that can improve torsional rigidity of a rear body that has side members and a cross member. A bracket has a top wall portion to which an HV (high voltage) battery is fixed. Further, the bracket has a first leg portion, that extends from a front end portion of the top wall portion toward a vehicle lower side and that is fixed to a first rear cross member, and a second leg portion, that extends from a vehicle transverse direction outer side end portion of the top wall portion toward the vehicle lower side and that is fixed to a rear side member.

3 Claims, 7 Drawing Sheets

(56) References Cited

U.S. PATENT DOCUMENTS

| | | | | |
|---|---|---|---|---|
| 6,416,117 | B1* | 7/2002 | Weiman | B62D 21/09 |
| | | | | 296/203.03 |
| 6,672,620 | B2* | 1/2004 | Kawazu | B60K 15/07 |
| | | | | 280/834 |
| 7,513,329 | B2* | 4/2009 | Nakashima | B60G 7/006 |
| | | | | 180/312 |
| 8,037,960 | B2* | 10/2011 | Kiya | B60K 1/04 |
| | | | | 180/68.5 |
| 8,528,967 | B2* | 9/2013 | Schwarz | B62D 25/087 |
| | | | | 296/203.04 |
| 8,690,218 | B2* | 4/2014 | Kuhl | B62D 25/025 |
| | | | | 296/193.08 |
| 9,004,579 | B2* | 4/2015 | Kim | B62D 25/087 |
| | | | | 296/193.02 |
| 9,187,130 | B2* | 11/2015 | Katou | B62D 25/04 |
| 2010/0133879 | A1* | 6/2010 | Leonetti | B62D 25/088 |
| | | | | 296/193.08 |
| 2013/0126255 | A1 | 5/2013 | Saeki | |
| 2016/0297481 | A1* | 10/2016 | Yokoi | B62D 25/087 |

FOREIGN PATENT DOCUMENTS

| | | | | |
|---|---|---|---|---|
| JP | 2004284576 A | | 10/2004 | |
| JP | 2007253933 A | * | 10/2007 | B60K 1/04 |
| JP | 2011126439 A | | 6/2011 | |
| JP | 2011131796 A | * | 7/2011 | B62D 25/087 |
| JP | 2012040993 A | | 3/2012 | |
| JP | 2013107541 A | | 6/2013 | |
| JP | 2014061809 A | * | 4/2014 | B60G 15/067 |
| JP | WO 2016199499 A1 | * | 12/2016 | B62D 25/08 |
| JP | WO 2016199500 A1 | * | 12/2016 | B62D 25/08 |
| WO | 03/062032 A1 | | 7/2003 | |

* cited by examiner

VEHICLE REAR PORTION STRUCTURE

CROSS-REFERENCE TO RELATED APPLICATIONS

This is a national phase application based on the PCT International Patent Application No. PCT/JP2014/073713 filed Sep. 8, 2014, claiming priority to Japanese Patent Application No. 2013-198543 filed Sep. 25, 2013, the entire contents of both of which are incorporated herein by reference.

TECHNICAL FIELD

The present invention relates to a vehicle rear portion structure.

BACKGROUND ART

Structures are known in which a vehicle mounted object is supported by vehicle body skeleton members at a vehicle rear portion (see, for example, Japanese Patent Applications JP 2011-126439 A and JP 2012-40993 A (Laid-Open)). For example, in following Patent Document 1, a battery that is a vehicle mounted object is supported via brackets at the vehicle transverse direction intermediate portion of a cross member that connects a pair of left and right side members.

SUMMARY OF INVENTION

Technical Problem

However, in this structure, because the load of the battery is applied only to the vehicle transverse direction intermediate portion of the cross member, there is room for improvement with regard to the torsional rigidity of the rear body that has the side members and the cross member.

In view of the above-described circumstances, an object of the present invention is to obtain a vehicle rear portion structure that can improve the torsional rigidity of a rear body that has side members and a cross member.

Solution to Problem

A vehicle rear portion structure relating to a first aspect of the present invention comprises: a pair of left and right rear side members that extend along a vehicle longitudinal direction at both sides of a vehicle body rear portion; a rear cross member that connects the pair of left and right rear side members and extends along a vehicle transverse direction; and brackets that have a fixing portion to which a vehicle mounted object is fixed, a first leg portion that extends from the fixing portion toward one side in a vehicle vertical direction and is fixed to the rear cross member, and a second leg portion that extends from the fixing portion toward the one side in the vehicle vertical direction and is fixed to the rear side member, and wherein the first leg portion comprises: a first mounting portion that is fixed to the rear cross member; and a first vertical wall portion that connects the first mounting portion and the fixing portion, and the second leg portion comprises: a second mounting portion that is fixed to the rear side member; and a second vertical wall portion that connects the second mounting portion and the fixing portion, and a first end surface at one side in the vehicle longitudinal direction at the first vertical wall portion, and a second end surface at another side in the vehicle longitudinal direction at the second vertical wall portion, are inclined in directions of moving away from one another while heading toward the one side in the vehicle vertical direction as seen in a vehicle side view.

In accordance with the above-described structure, the pair of left and right rear side members extend along the vehicle longitudinal direction at both sides of the vehicle body rear portion, whereas the rear cross member connects the pair of left and right rear side members and extends along the vehicle transverse direction. Therefore, when load is inputted to the rear side members at the time of road surface input, force that makes the rear side members start to twist with respect to the rear cross member can be applied. Here, in the present invention, the vehicle mounted object is fixed to the fixing portions of the brackets, and the first leg portions of the brackets extend from the fixing portions toward one side in the vehicle vertical direction and are fixed to the rear cross member, and the second leg portions of the brackets extend from the fixing portions toward one side in the vehicle vertical direction and are fixed to the rear side members. Therefore, the load of the vehicle mounted object is applied via the first leg portions of the brackets to the rear cross member at one side in the vehicle vertical direction, and is applied via the second leg portions of the brackets to the rear side members at one side in the vehicle vertical direction. Accordingly, the amount of relative displacement in the vehicle vertical direction of the rear side members and the rear cross member is suppressed.

Further, in accordance with the above-described structure, the first end surface at one side in the vehicle longitudinal direction at the first vertical wall portion of the first leg portion, and the second end surface at another side in the vehicle longitudinal direction at the second vertical wall portion of the second leg portion, are inclined in directions of moving away from one another while heading toward one side in the vehicle vertical direction, as seen in a vehicle side view. Therefore, in a case in which the vehicle mounted object starts to move inertially toward one side in the vehicle longitudinal direction, pushing force along the direction of inclination of first end surface can be applied to the first leg portion while tensile force along the direction of inclination of the second end surface is applied to the second leg portion. Further, deformation of the bracket is suppressed due to the first leg portion, that has the first end surface, causing the rear cross member to support the load and resisting (standing firm against) the aforementioned pushing force, while the second leg portion, that has the second end surface, resists the aforementioned tensile force together with the rear side member in a state in which the second leg portion is stretched. On the other hand, in a case in which the vehicle mounted object starts to inertially move toward another side in the vehicle longitudinal direction, pushing force along the direction of inclination of the second end surface can be applied to the second leg portion while tensile force along the direction of inclination of the first end surface is applied to the first leg portion. Further, deformation of the bracket is suppressed due to the second leg portion, that has the second end surface, causing the rear side member to support the load and resisting (standing firm against) the aforementioned pushing force, while the first leg portion, that has the first end surface, resists the aforementioned tensile force together with the rear cross member in a state in which the first leg portion is stretched. Accordingly, even if the vehicle decelerates or accelerates in the vehicle longitudinal direction, cross-sectional deformation of the bracket is suppressed.

A vehicle rear portion structure relating to a second aspect of the present invention comprises: a pair of left and right rear side members that extend along a vehicle longitudinal direction at both sides of a vehicle body rear portion; a rear cross member that connects the pair of left and right rear side members and extends along a vehicle transverse direction; brackets that have a fixing portion to which a vehicle mounted object is fixed, a first leg portion that extends from the fixing portion toward one side in a vehicle vertical direction and is fixed to the rear cross member, and a second leg portion that extends from the fixing portion toward the one side in the vehicle vertical direction and is fixed to the rear side member, a first fastening point of the first leg portion and the rear cross member, at further toward one side in the vehicle longitudinal direction than a fastening point of the fixing portion and the vehicle mounted object, and a second fastening point of the second leg portion and the rear side member, at further toward another side in the vehicle longitudinal direction than the fastening point of the fixing portion and the vehicle mounted object.

In accordance with the above-described structure, the pair of left and right rear side members extend along the vehicle longitudinal direction at both sides of the vehicle body rear portion, whereas the rear cross member connects the pair of left and right rear side members and extends along the vehicle transverse direction. Therefore, when load is inputted to the rear side members at the time of road surface input, force that makes the rear side members start to twist with respect to the rear cross member can be applied. Here, in the present invention, the vehicle mounted object is fixed to the fixing portions of the brackets, and the first leg portions of the brackets extend from the fixing portions toward one side in the vehicle vertical direction and are fixed to the rear cross member, and the second leg portions of the brackets extend from the fixing portions toward one side in the vehicle vertical direction and are fixed to the rear side members. Therefore, the load of the vehicle mounted object is applied via the first leg portions of the brackets to the rear cross member at one side in the vehicle vertical direction, and is applied via the second leg portions of the brackets to the rear side members at one side in the vehicle vertical direction. Accordingly, the amount of relative displacement in the vehicle vertical direction of the rear side members and the rear cross member is suppressed.

Further, in accordance with the above-described structure, the bracket is fastened to the rear cross member at a first fastening point that is further toward one side in the vehicle longitudinal direction than the fastening point of the fixing portion and the vehicle mounted object, and the bracket is fastened to the rear side member at a second fastening point that is further toward another side in the vehicle longitudinal direction than the fastening point of the fixing portion and the vehicle mounted object. Therefore, in a case in which the vehicle mounted object starts to move inertially in the vehicle longitudinal direction, tilting of the bracket is suppressed effectively.

A third aspect of the present invention comprises, in the vehicle rear portion structure relating to the first aspect, a first fastening point of the first leg portion and the rear cross member, at further toward one side in the vehicle longitudinal direction than a fastening point of the fixing portion and the vehicle mounted object, and a second fastening point of the second leg portion and the rear side member, at further toward another side in the vehicle longitudinal direction than a fastening point of the fixing portion and the vehicle mounted object.

Note that, "one side in the vehicle longitudinal direction" recited in the first aspect and "one side in the vehicle longitudinal direction" recited in the third aspect are the same side, and "another side in the vehicle longitudinal direction" recited in the first aspect and "another side in the vehicle longitudinal direction" recited in the third aspect are the same side.

In accordance with the above-described structure, the bracket is fastened to the rear cross member at a first fastening point that is further toward one side in the vehicle longitudinal direction than the fastening point of the fixing portion and the vehicle mounted object, and the bracket is fastened to the rear side member at a second fastening point that is further toward another side in the vehicle longitudinal direction than the fastening point of the fixing portion and the vehicle mounted object. Therefore, in a case in which the vehicle mounted object starts to move inertially in the vehicle longitudinal direction, tilting of the bracket is suppressed effectively.

Advantageous Effects of Invention

As described above, the vehicle rear portion structure relating to the first aspect and the second aspect of the present invention has the excellent effect that the torsional rigidity of the rear body, that has the side members and the cross member, can be improved.

Further, the vehicle rear portion structure relating to the first aspect of the present invention has the excellent effect that, by suppressing cross-sectional deformation of the brackets, the load of the vehicle mounted object can be stably applied to the side members and the cross member.

Further, the vehicle rear portion structure relating to the second aspect and third aspect of the present invention has the excellent effect that, by suppressing tilting of the brackets, the load of the vehicle mounted object can be stably applied to the side members and the cross member.

BRIEF DESCRIPTION OF DRAWINGS

FIG. 4A corresponds to the cross-section along line 4-4 of FIG. 3, and shows a case in which a vehicle mounted object starts to inertially move toward the vehicle front side.

FIG. 4B corresponds to the cross-section along line 4-4 of FIG. 3, and shows a case in which the vehicle mounted object starts to inertially move toward the vehicle rear side.

DESCRIPTION OF EMBODIMENTS

First Embodiment

A vehicle rear portion structure relating to a first embodiment of the present invention is described by using FIG. 1 through FIG. 4B. Note that arrow FR that is shown appropriately in these drawings indicates the vehicle front side, arrow UP indicates the vehicle upper side, and arrow OUT indicates a vehicle transverse direction outer side.

Figure 1:
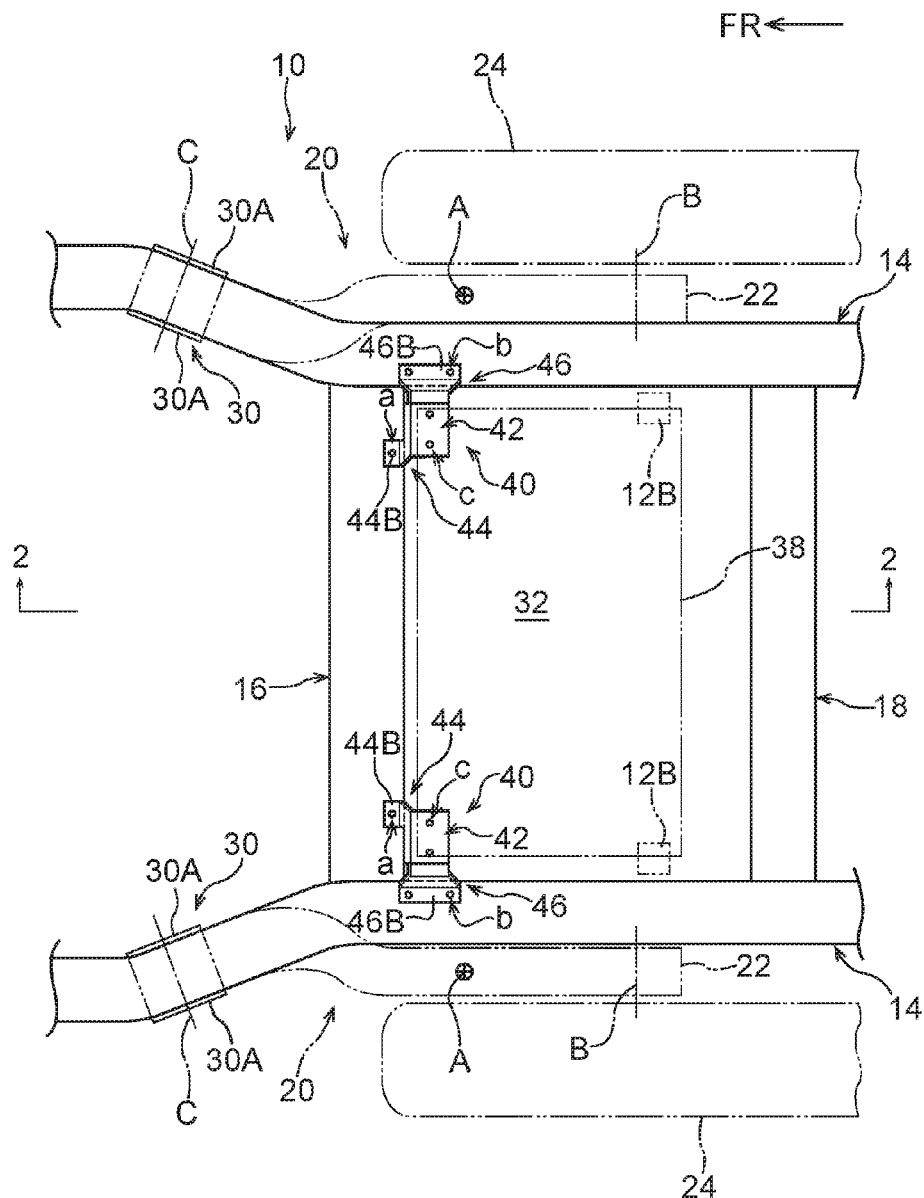
FIG. 1 is a schematic plan view showing a vehicle rear portion structure relating to a first embodiment.
Figure 2:
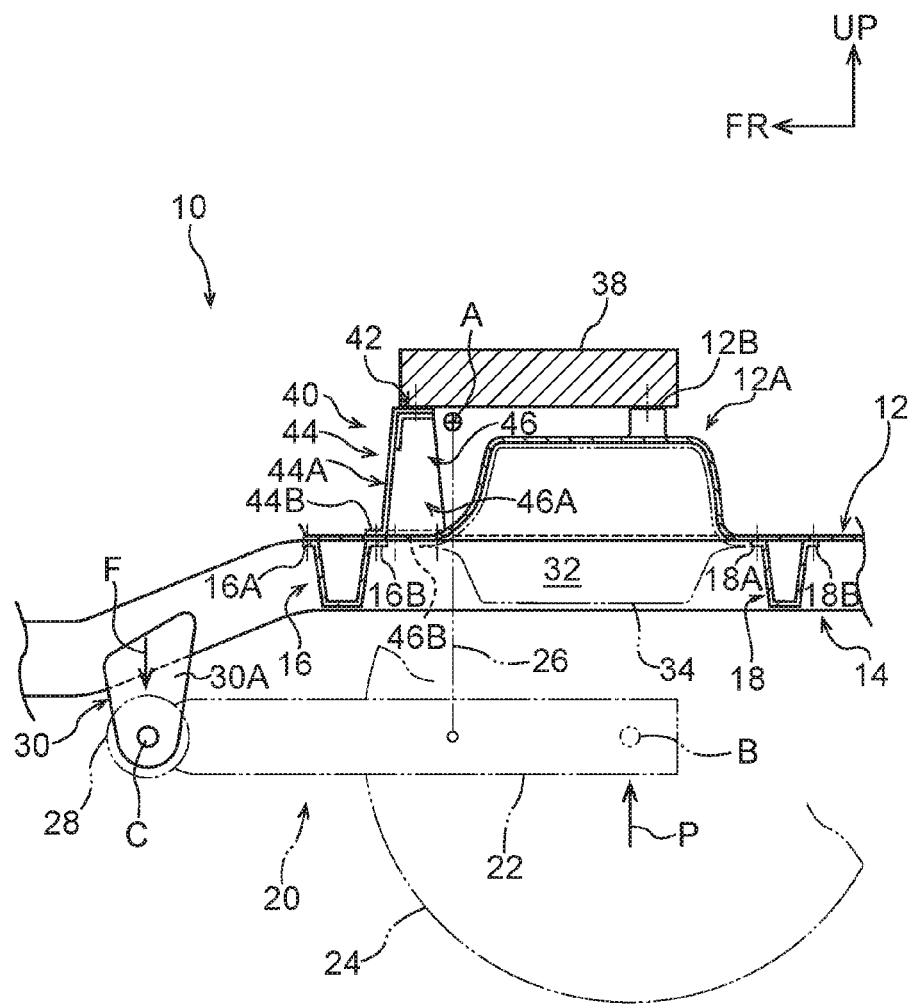
FIG. 2 is a schematic side sectional view along line 2-2 of FIG. 1.

A schematic plan view of a rear body 10, to which the vehicle rear portion structure relating to the present embodiment is applied, is shown in FIG. 1 in a state of seeing through a vehicle body floor 12 (see FIG. 2). Further, a schematic side sectional view along line 2-2 of FIG. 1 is shown in FIG. 2, and a portion of the vehicle left side of the rear body 10 is shown in a perspective view in FIG. 3.

Figure 3:
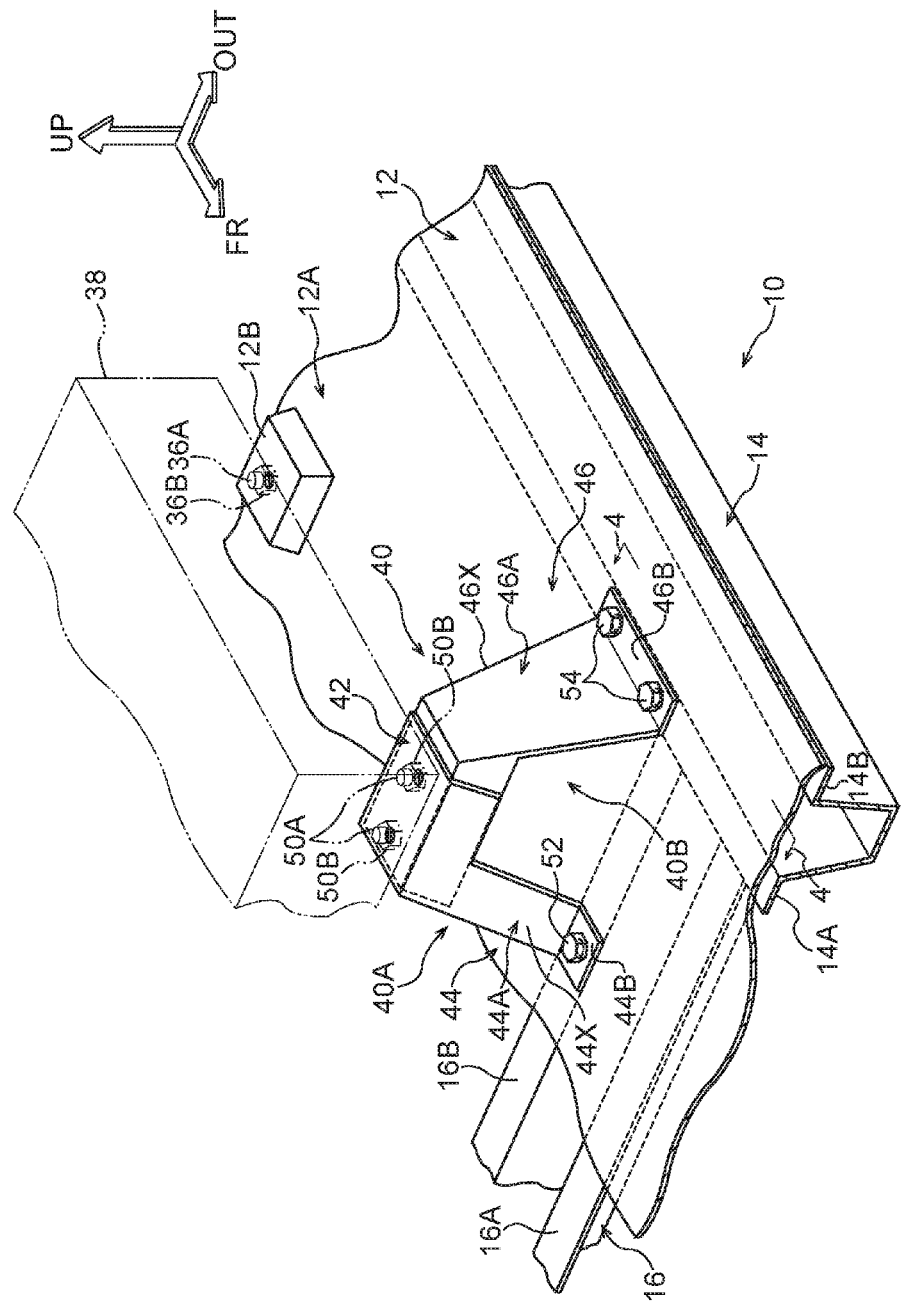
FIG. 3 is a perspective view of a portion of a vehicle left side of the vehicle rear portion structure shown in FIG. 1.

As shown in FIG. 1 and FIG. 2, a pair of left and right rear side members 14 extend along the vehicle longitudinal direction at both sides of the vehicle body rear portion. As shown in FIG. 3, the cross-sectional shape of the rear side member 14 as seen in a vehicle front view is formed in the shape of a hat that opens toward the vehicle upper side (not illustrated in FIG. 1 and FIG. 2). Left and right flange portions 14A, 14B, that are disposed at the vehicle upper side at the rear side member 14, are joined to the bottom surface of the vehicle body floor 12, and a closed cross-sectional structure is formed thereby.

As shown in FIG. 1, the pair of left and right rear side members 14 are connected in the vehicle transverse direction by a first rear cross member 16 that serves as a rear cross member, and are connected in the vehicle transverse direction by a second rear cross member 18 that is disposed apart from the first rear cross member 16 at the vehicle rear side thereof. The first rear cross member 16 and the second rear cross member 18 extend along the vehicle transverse direction, and, together with the pair of left and right rear side members 14, structure the rear body 10.

As shown in FIG. 2, the cross-sectional shapes of the first rear cross member 16 and the second rear cross member 18 as seen in a vehicle side view are formed in the shapes of hats that open toward the vehicle upper side (not illustrated in FIG. 1). Front and rear flange portions 16A, 16B, that are disposed at the vehicle upper side at the first rear cross member 16, are joined to the bottom surface of the vehicle body floor 12, and a closed cross-sectional structure is formed thereby. Similarly, front and rear flange portions 18A, 18B, that are disposed at the vehicle upper side at the second rear cross member 18, are joined to the bottom surface of the vehicle body floor 12, and a closed cross-sectional structure is formed thereby. As shown in FIG. 1, the respective length direction both end portions of the first rear cross member 16 and the second rear cross member 18 are joined to side surfaces of the rear side members 14.

The structures of rear suspensions 20, that are provided at the vehicle rear portion, are summarized next. The rear suspensions 20 have a pair of left and right trailing arms (also called "suspension arms") 22 at the both sides of the vehicle rear portion. The trailing arms 22 extend in the vehicle longitudinal direction. The vehicle longitudinal direction intermediate portions of the trailing arms 22 are connected in the vehicle transverse direction by an unillustrated intermediate beam. This intermediate beam extends along the vehicle transverse direction. Unillustrated carriers, that support rear wheels 24 so as to rotate freely, are mounted to the rear end portions of the trailing arms 22. Further, shock absorbers 26, that are illustrated in a simplified manner in FIG. 2, stand upright at the inner sides of the aforementioned carriers. Further, as shown in FIG. 2, bushes 28 are mounted to the front end portions of the trailing arms 22. The bushes 28 are pivotally-supported between both side portions 30A of mounting brackets 30 that are mounted to the rear side members 14. Due thereto, the left and right trailing arms 22 are made to be swingable.

Note that, as shown in FIG. 1 and FIG. 2, given that the mounting point of the shock absorber 26 (see FIG. 2) to the rear body 10 is A, road surface input point B to the rear wheel 24 at the time when the vehicle travels is positioned at the vehicle rear side of point A. Further, mounting point C of the trailing arm 22 to the rear body 10 exists at the vehicle front side of point A.

A fuel tank 34 (see FIG. 2) is disposed in a space 32 that is surrounded by the pair of left and right rear side members 14 and the front-rear pair of the first rear cross member 16 and the second rear cross member 18. As shown in FIG. 2, in order to keep the bottom surface position of the fuel tank 34 apart from the road surface side, the vehicle body floor 12 has a bulging portion 12A that bulges-out toward the vehicle upper side in correspondence with the aforementioned space 32. Note that explanation of the mounting of the fuel tank 34 to the rear body 10 is omitted.

Convex portions 12B are formed at the top portion of the bulging portion 12A of the vehicle body floor 12, at the both end portions in the vehicle transverse direction, at the end portion that is at the rear side in the vehicle longitudinal direction of the top portion of the bulging portion 12A. The pair of left and right convex portions 12B bulge-out toward the vehicle upper side. As shown in FIG. 3, the rear end portion of an HV battery 38 that serves as a vehicle mounted object is placed on these convex portions 12B. Further, the rear end portion of the HV battery 38 is fastened and fixed to the convex portions 12B by bolts 36A and weld nuts 36B. Note that, in FIG. 2, illustration of the bolts and the like at the places fastened by the bolts is omitted, and the lines of fastening by the bolts are shown by the one-dot chain lines.

As shown in FIG. 1, brackets (also called "mounting brackets") 40 are disposed at the two corner portions where the rear side members 14 and the first rear cross member 16 intersect. As shown in FIG. 3, the bracket 40 is a joined body in which a first structural member 40A and a second structural member 40B are joined together.

The bracket 40 has a top wall portion 42 that serves as a fixing portion on which the front end portion of the HV battery 38 is placed. The top wall portion 42 is structured by the top wall portion of the first structural member 40A and the top wall portion of the second structural member 40B that are joined together. The front end portion of the HV battery 38 is fastened and fixed to the top wall portion 42 by bolts 50A and weld nuts 50B.

Further, the bracket 40 has a first leg portion 44 that structures the front portion thereof. The first leg portion 44 extends toward the vehicle lower side from the top wall portion 42, and is fixed to the first rear cross member 16. This first leg portion 44 is structured by the leg portion of the first structural member 40A and the front wall portion of the second structural member 40B that are joined to one another. Further, the first leg portion 44 has a first mounting portion 44B that is fixed to the first rear cross member 16, and a first vertical wall portion 44A that connects the first mounting portion 44B and the top wall portion 42 in the vehicle vertical direction.

Figure 4A:
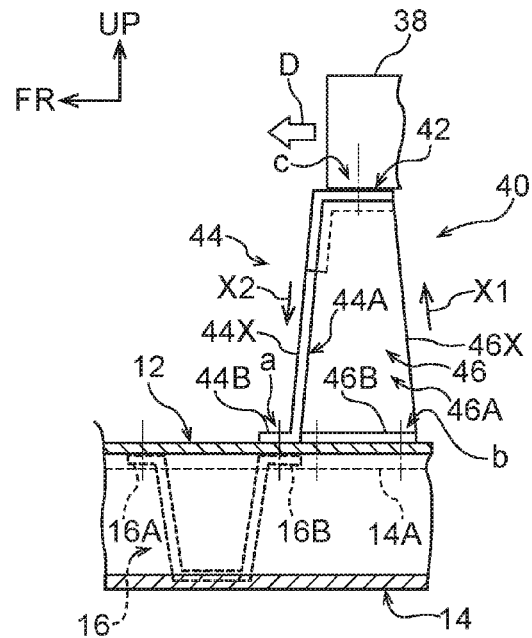
FIG. 4A is a side sectional view for explaining operation of the vehicle rear portion structure shown in FIG. 1.

The first vertical wall portion 44A of the first leg portion 44 is bent from the vehicle front side end portion at the top wall portion 42, and is inclined slightly toward the vehicle front side while heading toward the vehicle lower side, and extends to as far as the vehicle body floor 12. As shown in FIG. 4A that corresponds to the cross-section along line 4-4 of FIG. 3, a front end surface 44X, that serves as a first end surface and is at the vehicle front side of the first vertical wall portion 44A, is inclined slightly toward the vehicle front side while heading toward the vehicle lower side as seen in a vehicle side view. As shown in FIG. 3, the first vertical wall portion 44A is formed in a backward L-shape in which the portion, that is at the vehicle transverse direction outer side at the vehicle vertical direction intermediate portion and lower portion, is cut-out.

The first mounting portion 44B of the first leg portion 44 is bent from the lower end portion of the first vertical wall portion 44A, and extends toward the vehicle front side. The first mounting portion 44B is fastened and fixed by a bolt 52 and an unillustrated weld nut to the flange portion 16B of the first rear cross member 16 with the vehicle body floor 12 nipped therebetween. As shown in FIG. 4A, a first fastening point a of the first mounting portion 44B and the first rear cross member 16 is set at a position that is further toward the vehicle front side than fastening point c of the top wall portion 42 and the HV battery 38. Note that, in FIG. 4A, illustration of the bolts and the like at the places fastened by the bolts is omitted, and the lines of fastening by the bolts are shown by the one-dot chain lines (the same holds for FIG. 4B as well).

As shown in FIG. 3, the bracket 40 has a second leg portion 46 that structures the region at the vehicle transverse direction outer side thereof. The second leg portion 46 extends from the top wall portion 42 toward the vehicle lower side, and is fixed to the rear side member 14. This second leg portion 46 is structured by the leg portion of the second structural member 40B. Further, due to the first leg portion 44 and the second leg portion 46 being formed, the bracket 40 has a bifurcated shape. The second leg portion 46 has a second mounting portion 46B that is fixed to the rear side member 14, and a second vertical wall portion 46A that connects the second mounting portion 46B and the top wall portion 42 in the vehicle vertical direction.

The second vertical wall portion 46A of the second leg portion 46 is bent from the vehicle transverse direction outer side end portion at the top wall portion 42, and is inclined slightly toward the vehicle transverse direction outer side while heading toward the vehicle lower side, and extends to as far as the vehicle body floor 12. As shown in FIG. 4A, the second vertical wall portion 46A is made to be a trapezoidal shape that widens toward the vehicle lower side as seen in a vehicle side view. Therefore, a rear end surface 46X, that serves as a second end surface and is at the vehicle rear side at the second vertical wall portion 46A, is inclined slightly toward the vehicle rear side while heading toward the vehicle lower side as seen in a vehicle side view. Due thereto, the front end surface 44X at the first vertical wall portion 44A and the rear end surface 46X at the second vertical wall portion 46A are inclined in directions of moving away from one another (so as to widen) while heading toward the vehicle lower side as seen in a vehicle side view. Note that the ridgelines of the vehicle transverse direction both sides of the front end surface 44X at the first vertical wall portion 44A, and also the ridgelines of the vehicle transverse direction both sides of the rear end surface 46X at the second vertical wall portion 46A, are inclined in directions of moving away from one another while heading toward the vehicle lower side as seen in a vehicle side view.

As shown in FIG. 3, the second mounting portion 46B of the second leg portion 46 is bent from the lower end portion of the second vertical wall portion 46A, and extends toward the vehicle transverse direction outer side. The front portion and the rear portion of the second mounting portion 46B are fastened and fixed by bolts 54 and unillustrated weld nuts to the flange portion 14A of the rear side member 14 with the vehicle body floor 12 nipped therebetween. As shown in FIG. 4A, among the fastening points of the second mounting portion 46B and the rear side member 14, a second fastening point b that is at the rear side is set at a position that is further toward the vehicle rear side than the fastening point c of the top wall portion 42 and the HV battery 38.

Note that, in the present embodiment, the vehicle lower side corresponds to "one side in a vehicle vertical direction" that is recited in the first aspect of the present invention, and the vehicle front side corresponds to "one side in the vehicle longitudinal direction" that is recited in the first aspect of the present invention, the second aspect of the present invention, and the third aspect of the present invention, and the vehicle rear side corresponds to "another side in the vehicle longitudinal direction" that is recited in the first aspect of the present invention, the second aspect of the present invention, and the third aspect of the present invention.

(Operation/Effects)

Operation and effects of the above-described embodiment are described next.

In a case in which road surface input P is applied from the rear wheel 24 shown in FIG. 2, when the shock absorber 26 functions as a type of supporting pillar at that instant, pushing-down force F toward the vehicle lower side is applied to the mounting portion of the trailing arm 22 at the rear side member 14. Due to this pushing-down force F, force that makes the rear side member 14 start to twist with respect to the first rear cross member 16 is applied.

Here, in the present embodiment, as shown in FIG. 3, the HV battery 38 that is a weight mounted object is fixed to the top wall portion 42 of the bracket 40, and the first leg portion 44 of the bracket 40 extends from the top wall portion 42 toward the vehicle lower side and is fixed to the first rear cross member 16, and the second leg portion 46 of the bracket 40 extends from the top wall portion 42 toward the vehicle lower side and is fixed to the rear side member 14. Therefore, the load (weight) of the HV battery 38 is applied to the first rear cross member 16 at the vehicle lower side via the first leg portion 44 of the bracket 40, and is applied to the rear side member 14 at the vehicle lower side via the second leg portion 46 of the bracket 40. Namely, force that presses-down from the vehicle upper side acts on the first rear cross member 16 and the rear side member 14. Accordingly, the amount of relative displacement in the vehicle vertical direction of the rear side member 14 and the first rear cross member 16 is suppressed.

Further, due to the first leg portion 44 and the second leg portion 46 being formed, the bracket 40 is bifurcated. Therefore, as compared with a case in which, for example, the bracket 40 is fixed to the rear side member 14 and the first rear cross member 16 without being bifurcated, a concentration of stress in the vicinity of the upper side of the intersection portion of the rear side member 14 and the first rear cross member 16 can be avoided.

Further, in the present embodiment, as shown in FIG. 4A, the front end surface 44X at the first vertical wall portion 44A and the rear end surface 46X at the second vertical wall portion 46A are inclined in directions of moving away from one another while heading toward the lower side, as seen in a vehicle side view. Therefore, in a case in which the HV battery 38 starts to move inertially toward the vehicle front side (refer to arrow D), pushing force X2 along the direction of inclination of the front end surface 44X can be applied to the first leg portion 44 while tensile force X1 along the direction of inclination of the rear end surface 46X is applied to the second leg portion 46. Further, deformation of the bracket 40 is suppressed due to the first leg portion 44, that has the front end surface 44X, causing the first rear cross member 16 to support the load and resisting (standing firm against) the pushing force X2, while the second leg portion 46, that has the rear end surface 46X, resists the tensile force X1 together with the rear side member 14 in a state in which the second leg portion 46 is stretched.

Figure 4B:
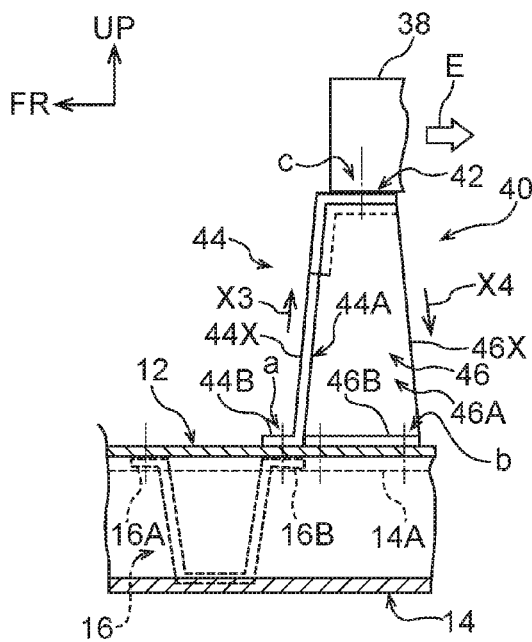
FIG. 4B is a side sectional view for explaining operation of the vehicle rear portion structure shown in FIG. 1.

On the other hand, as shown in FIG. 4B, in a case in which the HV battery 38 starts to inertially move toward the vehicle rear side (refer to the arrow E direction), pushing force X4 along the direction of inclination of the rear end surface 46X can be applied to the second leg portion 46 while tensile force X3 along the direction of inclination of the front end surface 44X is applied to the first leg portion 44. Further, deformation of the bracket 40 is suppressed due to the second leg portion 46, that has the rear end surface 46X, causing the rear side member 14 to support the load and resisting (standing firm against) the aforementioned pushing force, while the first leg portion 44, that has the front end surface 44X, resists the aforementioned tensile force X3 together with the first rear cross member 16 in a state in which the first leg portion 44 is stretched.

Further, in the present embodiment, the first fastening point a of the first mounting portion 44B and the first rear cross member 16 is set further toward the vehicle front side than the fastening point c of the top wall portion 42 and the HV battery 38, and, among the fastening points of the second mounting portion 46B and the rear side member 14, the second fastening point b that is at the rear side is set further toward the vehicle rear side than the fastening point c of the top wall portion 42 and the HV battery 38. Therefore, in a case in which the HV battery 38 starts to move inertially in the vehicle longitudinal direction, tilting of the bracket 40 is effectively suppressed.

Accordingly, even if the vehicle decelerates or accelerates in the vehicle longitudinal direction, cross-sectional deformation of the brackets 40 is suppressed, and therefore, the load of the HV battery 38 can be stably applied to the rear side members 14 and the first rear cross member 16.

As described above, in accordance with the vehicle rear portion structure relating to the present embodiment, the torsional rigidity of the rear body 10, that has the rear side members 14 and the first rear cross member 16, can be improved. Due thereto, even if there is input from the rear suspensions 20 shown in FIG. 2, vibration of the rear body 10 is suppressed. As a result, vibration of the vehicle body floor 12 is suppressed, and therefore, the handling stability, the comfort of the ride, and the NV (noise/vibration) performance can be improved.

Second Embodiment

Figure 5:
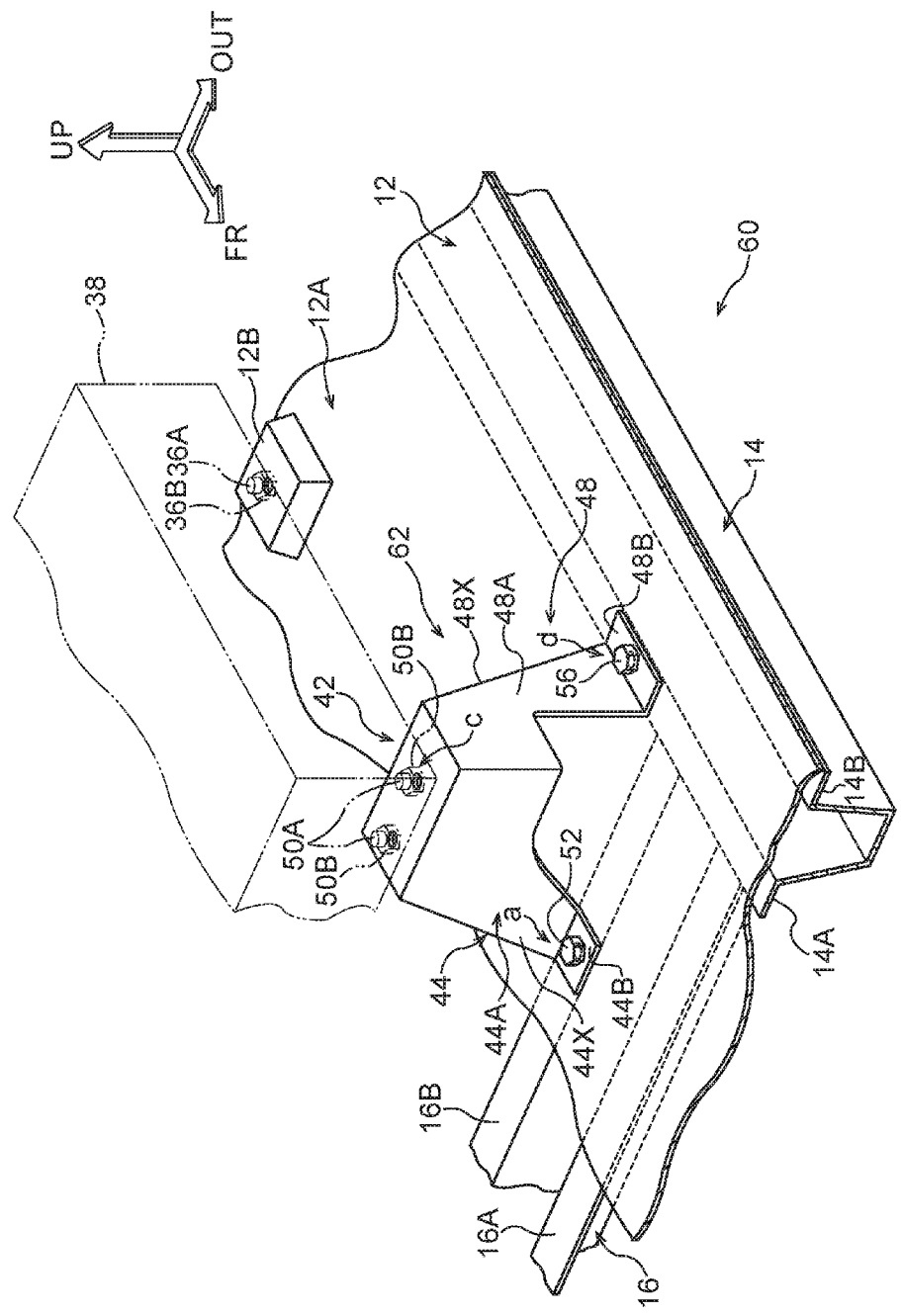
FIG. 5 is a perspective view showing a vehicle rear portion structure relating to a second embodiment.

A vehicle rear portion structure relating to a second embodiment of the present invention is described next by using FIG. 5. A portion of the vehicle left side of a rear body 60, to which the vehicle rear portion structure relating to the present embodiment is applied, is shown in FIG. 5 in a schematic perspective view. As shown in this drawing, the present embodiment differs from the first embodiment with regard to the point that a bracket 62 is formed by a single member. The other structures are structures that are substantially similar to those of the first embodiment. Accordingly, the structural portions that are substantially similar to those of the first embodiment are denoted by the same reference numerals, and description thereof is omitted. Note that the top wall portion 42 and the first leg portion 44 of the bracket 62 differ from the top wall portion 42 and the first leg portion 44 of the bracket 40 in the first embodiment that is shown in FIG. 3 with regard to the point that both are structured by portions of a single plate and do not have overlapping portions, but, with regard to the other points, they can be called structural portions that are substantially similar to the top wall portion 42 and the first leg portion 44 of the bracket 40 of the first embodiment, and therefore, they are denoted by the same reference numerals and description thereof is omitted.

As shown in FIG. 5, the bracket 62 has, instead of the second leg portion 46 (see FIG. 3) of the first embodiment, a second leg portion 48 that structures the region at the vehicle transverse direction outer side. Due to the first leg portion 44 and the second leg portion 48 being formed, the bracket 62 has a bifurcated shape. The second leg portion 48 extends from the top wall portion 42 toward the vehicle lower side, and is fixed to the rear side member 14. Note that, in the present embodiment as well, in the same way as in the first embodiment, the vehicle lower side corresponds to "one side in a vehicle vertical direction" that is recited in the first aspect of the present invention. The second leg portion 48 has a second mounting portion 48B that is fixed to the rear side member 14, and a second vertical wall portion 48A that connects the second mounting portion 48B and the top wall portion 42 in the vehicle vertical direction.

The second vertical wall portion 48A of the second leg portion 48 is bent from the vehicle transverse direction outer side end portion at the top wall portion 42, and is inclined slightly toward the vehicle transverse direction outer side while heading toward the vehicle lower side, and extends to as far as the vehicle body floor 12. This second vertical wall portion 48A is formed in a shape that is such that the region at the lower portion side and the vehicle front side of the second vertical wall portion 46A of the first embodiment (see FIG. 3), is cut-out. A rear end surface 48X, that serves as a second end surface and is at the vehicle rear side at the second vertical wall portion 48A, is inclined slightly toward the vehicle rear side while heading toward the vehicle lower side as seen in a vehicle side view. Due thereto, the front end surface 44X at the first vertical wall portion 44A and the rear end surface 48X at the second vertical wall portion 48A are inclined in directions of moving away from one another (so as to widen) while heading toward the vehicle lower side as seen in a vehicle side view.

The second mounting portion 48B of the second leg portion 48 is bent from the lower end portion of the second vertical wall portion 48A, and extends toward the vehicle transverse direction outer side. This second mounting portion 48B is formed in a shape that is such that the region at the vehicle front side of the second mounting portion 46B of the first embodiment (see FIG. 3) is cut away. The second mounting portion 48B is fastened and fixed by a bolt 56 and an unillustrated weld nut to the flange portion 14A of the rear side member 14 with the vehicle body floor 12 nipped therebetween. A second fastening point d of the second mounting portion 48B and the rear side member 14 is set at a position that is further toward the vehicle rear side than the fastening point c of the top wall portion 42 and the HV battery 38.

In accordance with the structure of the present embodiment as well, operation and effects that are similar to those of the above-described first embodiment are obtained.

Third Embodiment

Figure 6:
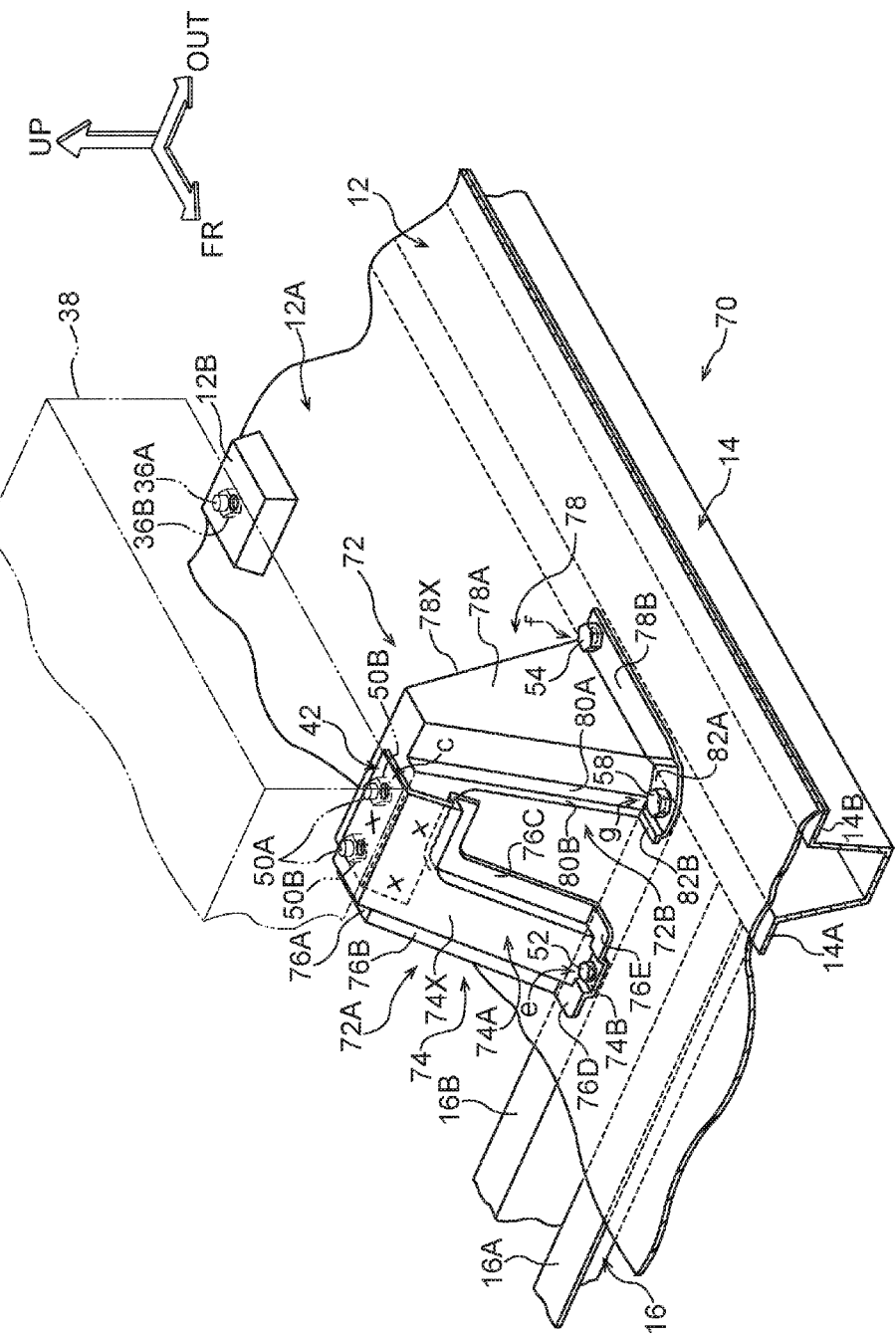
FIG. 6 is a perspective view showing a vehicle rear portion structure relating to a third embodiment.

A vehicle rear portion structure relating to a third embodiment of the present invention is described next by using FIG. 6. A portion of the vehicle left side of a rear body 70, to which the vehicle rear portion structure relating to the present embodiment is applied, is shown in FIG. 6 in a schematic perspective view. Note that structural portions that are substantially similar to those of the first embodiment are denoted by the same reference numerals, and description thereof is omitted.

As shown in FIG. 6, a bracket 72 is a joined body in which a first structural member 72A and a second structural member 72B are joined. The top wall portion 42 of the bracket 72 is structured by the top wall portion of the first structural member 72A and the top wall portion of the second structural member 72B that are joined to one another.

An upper side reinforcing portion 76A, that is bent in the shape of a step toward the vehicle lower side from the vehicle transverse direction inner side end portion of the top wall portion 42 and that juts-out toward the vehicle transverse direction inner side, is formed at the bracket 72. The upper side reinforcing portion 76A is structured by the first structural member 72A.

Further, the bracket 72 has, at the front portion thereof, a first leg portion 74. The first leg portion 74 extends from the top wall portion 42 toward the vehicle lower side, and is fixed to the first rear cross member 16. This first leg portion 74 is structured by the leg portion of the first structural member 72A and the upper side front wall portion of the second structural member 72B that are joined to one another. The first leg portion 74 has a first mounting portion 74B that is fixed to the first rear cross member 16, and a first vertical wall portion 74A that connects the first mounting portion 74B and the top wall portion 42 in the vehicle vertical direction.

The first vertical wall portion 74A of the first leg portion 74 is bent from the vehicle front side end portion at the top wall portion 42, and is inclined slightly toward the vehicle front side while heading toward the vehicle lower side, and extends to as far as the vehicle body floor 12. Therefore, a front end surface 74X, that serves as a first end surface and is at the vehicle front side of the first vertical wall portion 74A, is inclined slightly toward the vehicle front side while heading toward the vehicle lower side as seen in a vehicle side view. The first vertical wall portion 74A is formed in a backward L-shape in which the portion, that is at the vehicle transverse direction outer side at the vehicle vertical direction intermediate portion and lower portion, is cut-out.

A vertical wall reinforcing portion 76B, that is bent in the shape of a step toward the vehicle rear side from the vehicle transverse direction inner side end portion of the first vertical wall portion 74A and that juts-out toward the vehicle transverse direction inner side, is formed. The vertical wall reinforcing portion 76B is structured by the first structural member 72A, and the upper end portion of the vertical wall reinforcing portion 76B is formed continuously with the vehicle front side end portion of the upper side reinforcing portion 76A. Further, a vertical wall reinforcing portion 76C, that is bent in the shape of a step toward the vehicle rear side also from the cut-out side end portion of the first vertical wall portion 74A and that juts-out toward the cut-out side, is formed. The vertical wall reinforcing portion 76C is structured by the first structural member 72A.

Further, the first mounting portion 74B of the first leg portion 74 is bent from the lower end portion of the first vertical wall portion 74A, and extends toward the vehicle front side. This first mounting portion 74B is fastened and fixed by the bolt 52 and an unillustrated weld nut to the flange portion 16B of the first rear cross member 16 with the vehicle body floor 12 nipped therebetween. A first fastening point e of the first mounting portion 74B and the first rear cross member 16 is set at a position that is further toward the vehicle front side than the fastening point c of the top wall portion 42 and the HV battery 38.

A lower side reinforcing portion 76D, that is bent in the shape of a step toward the vehicle upper side from the vehicle transverse direction inner side end portion of the first mounting portion 74B and that juts-out toward the vehicle transverse direction inner side, is formed. The lower side reinforcing portion 76D is structured by the first structural member 72A, and is formed continuously with the respective lower end portions of the first vertical wall portion 74A and the vertical wall reinforcing portion 76B. A lower side reinforcing portion 76E, that is bent in the shape of a step toward the vehicle upper side from the vehicle transverse direction outer side end portion of the first mounting portion 74B and that juts-out toward the vehicle transverse direction outer side, is formed. The lower side reinforcing portion 76E is structured by the first structural member 72A, and is formed continuously with the respective lower end portions of the first vertical wall portion 74A and the vertical wall reinforcing portion 76C.

Further, the bracket 72 has a second leg portion 78 at the vehicle transverse direction outer side region thereof. The second leg portion 78 extends toward the vehicle lower side from the top wall portion 42, and is fixed to the rear side member 14. This second leg portion 78 is structured by the leg portion of the second structural member 72B. Further, due to the first leg portion 74 and the second leg portion 78 being formed, the bracket 72 has a bifurcated shape. The second leg portion 78 has a second mounting portion 78B that is fixed to the rear side member 14, and a second vertical wall portion 78A that connects the second mounting portion 78B and the top wall portion 42 in the vehicle vertical direction.

The second vertical wall portion 78A of the second leg portion 78 is bent from the vehicle transverse direction outer side end portion at the top wall portion 42, and is inclined slightly toward the vehicle transverse direction outer side while heading toward the vehicle lower side, and extends to as far as the vehicle body floor 12. The upper end portion of the second vertical wall portion 78A is continuous with the vehicle longitudinal direction intermediate portion and rear portion of the top wall portion 42, and is formed in a trapezoidal shape that widens toward the vehicle lower side as seen in a vehicle side view. Therefore, a rear end surface 78X, that serves as a second end surface and is at the vehicle rear side at the second vertical wall portion 78A, is inclined slightly toward the vehicle rear side while heading toward the vehicle lower side as seen in a vehicle side view. Due thereto, the front end surface 74X at the first vertical wall portion 74A and the rear end surface 78X at the second vertical wall portion 78A are inclined in directions of moving away from one another (so as to widen) while heading toward the vehicle lower side as seen in a vehicle side view.

The second mounting portion 78B of the second leg portion 78 is bent from the lower end portion of the second vertical wall portion 78A, and extends toward the vehicle transverse direction outer side. The rear portion of this second mounting portion 78B is fastened and fixed by the bolt 54 and an unillustrated weld nut to the flange portion 14A of the rear side member 14 with the vehicle body floor 12 nipped therebetween. A second fastening point f of the second mounting portion 78B and the rear side member 14 is set at a position that is further toward the vehicle rear side than the fastening point c of the top wall portion 42 and the HV battery 38.

Note that, in the present embodiment, in the same way as in the first embodiment, the vehicle lower side corresponds to "one side in a vehicle vertical direction" that is recited in the first aspect of the present invention, and the vehicle front side corresponds to "one side in the vehicle longitudinal direction" that is recited in the first aspect of the present invention, the second aspect of the present invention, and the third aspect of the present invention, and the vehicle rear side corresponds to "another side in the vehicle longitudinal direction" that is recited in the first aspect of the present invention, the second aspect of the present invention, and the third aspect of the present invention.

On the other hand, a vertical wall reinforcing portion 80A, that is bent in the shape of a step toward the vehicle transverse direction inner side from the vehicle longitudinal direction front end portion of the second vertical wall portion 78A at the second leg portion 78 and that extends toward the vehicle front side, is formed. The upper portion of the vertical wall reinforcing portion 80A is formed continuously with a portion of the vehicle transverse direction outer side end portion of the top wall portion 42 and with the vehicle transverse direction outer side end portion of the upper portion of the first vertical wall portion 74A. A reinforcing flange 80B, that juts-out toward the vehicle transverse direction inner side from the vehicle longitudinal direction front end portion at the vehicle vertical direction intermediate portion and lower portion of the vertical wall reinforcing portion 80A, is formed. The upper end of the reinforcing flange 80B is formed continuously with a portion of the upper portion of the first vertical wall portion 74A.

Further, a third mounting portion 82A, that is bent and juts-out toward the vehicle transverse direction inner side from the vehicle longitudinal direction front end portion of the second mounting portion 78B at the second leg portion 78, is formed. The third mounting portion 82A is fastened and fixed by a bolt 58 and an unillustrated weld nut to the vehicle transverse direction outer side end portion of the flange portion 16B of the first rear cross member 16 with the vehicle body floor 12 nipped therebetween. A third fastening point g of the third mounting portion 82A and the first rear cross member 16 is set at a position that is further toward the vehicle front side than the fastening point c of the top wall portion 42 and the HV battery 38. The vehicle rear side end portion of the third mounting portion 82A is formed continuously with the lower end portion of the vertical wall reinforcing portion 80A.

A lower side reinforcing portion 82B, that is bent in the shape of a step toward the vehicle upper side from the vehicle transverse direction inner side end portion of the third mounting portion 82A and that juts-out toward the vehicle transverse direction inner side, is formed. The rear end portion of the lower side reinforcing portion 82B is formed continuously with a portion of the lower end portion of the vertical wall reinforcing portion 80A and the lower end portion of the reinforcing flange 80B.

In accordance with the above-described structure as well, the torsional rigidity of the rear body 70 can be improved by operation that is similar to that of the above-described first embodiment. Further, in the present embodiment, relative displacement of the rear side member 14 and the first rear cross member 16 is suppressed also due to the third mounting portion 82A, that juts-out from the second mounting portion 78B, being fixed to the first rear cross member 16.

Note that, in a case in which load of torsion is applied to the rear body 70, stress can concentrate between the second mounting portion 78B and the third mounting portion 82A. However, in the present embodiment, because there is a reinforcing structure that includes the vertical wall reinforcing portion 80A, the reinforcing flange 80B and the lower side reinforcing portion 82B, deformation between the second mounting portion 78B and the third mounting portion 82A is suppressed.

Further, as a modified example of the third embodiment, if the front portion of the second mounting portion 78B of the second leg portion 78 also is fixed to the rear side member 14, the fastening points of the bracket 72 to the rear body 70 side can be increased as compared with the first embodiment.

Fourth Embodiment

Figure 7:
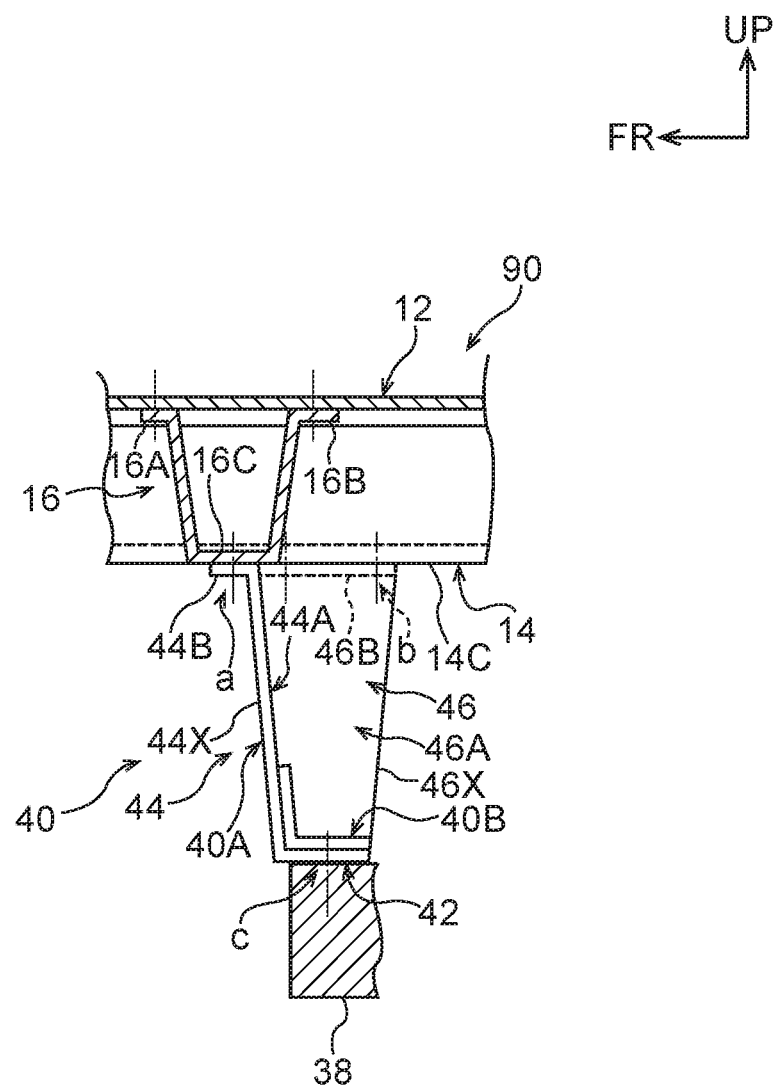
FIG. 7 is schematic side sectional view showing a vehicle rear portion structure relating to a fourth embodiment.

A vehicle rear portion structure relating to a fourth embodiment of the present invention is described next by using FIG. 7. Main portions of a vehicle rear portion structure relating to the present embodiment are shown in FIG. 7 in a schematic side sectional view (a portion of the cross-section corresponding to FIG. 2 of the first embodiment). As shown in this drawing, in the present embodiment, the point that the bracket 40 is disposed upside-down as compared with the first embodiment, and the attendant structures, differ from the vehicle rear portion structure relating to the first embodiment. The other structures are structures that are similar to those of the first embodiment. Accordingly, structural portions that are similar to those of the first embodiment are denoted by the same reference numerals, and description thereof is omitted.

As shown in FIG. 7, the HV battery 38 is suspended from and is fixed to the bracket 40. The first mounting portion 44B of the bracket 40 is fastened and fixed by an unillustrated bolt and an unillustrated weld nut to a bottom wall portion 16C of the first rear cross member 16. The second mounting portion 46B of the bracket 40 is fastened and fixed by an unillustrated bolt and an unillustrated weld nut to a bottom wall portion 14C of the rear side member 14. Note that, at the respective places fastened by the bolts in FIG. 7, illustration of the bolts and the like is omitted, and the lines of fastening by the bolts are shown by the one-dot chain lines. Further, the front end surface 44X at the first vertical wall portion 44A of the first leg portion 44, and the rear end surface 46X at the second vertical wall portion 46A of the second leg portion 46, are inclined in directions of moving away from one another while heading toward the vehicle upper side as seen in a vehicle side view.

In the present embodiment, the vehicle upper side corresponds to "one side in a vehicle vertical direction" that is recited in the first aspect of the present invention, and the vehicle front side corresponds to "one side in the vehicle longitudinal direction" that is recited in the first aspect of the present invention, the second aspect of the present invention, and the third aspect of the present invention, and the vehicle rear side corresponds to "another side in the vehicle longitudinal direction" that is recited in the first aspect of the present invention, the second aspect of the present invention, and the third aspect of the present invention.

In accordance with the structure of the present embodiment, the load of the HV battery 38 is applied as tensile force toward the vehicle lower side via the bracket 40 to the first rear cross member 16 and the rear side member 14. Accordingly, although operation differs from the operation of the above-described first embodiment with respect to this point, effects that are, for the most part, similar to those of the first embodiment are obtained by the structure of the present embodiment as well. Namely, in the present embodiment as well, the torsional rigidity of a rear body 90 that has the rear side members 14 and the first rear cross member 16 can be improved.

Further, in the present embodiment, because the load of the HV battery 38 can be applied to the bottom wall portion 16C of the first rear cross member 16 and the bottom wall portions 14C of the rear side members 14, the load of the HV battery 38 can be applied more stably to the first rear cross member 16 and the rear side members 14. Further, the present embodiment is applied to a vehicle of a high vehicle height, but because the HV battery 38 is not disposed at the upper side of the vehicle body floor 12, the vehicle cabin space can be set to be large.

Supplemental Description of Embodiments

Note that, as a modified example of the above-described embodiments, for example, the brackets may be disposed at the two corner portions where the rear side members 14 and the second rear cross member 18 that are shown in FIG. 1 and the like intersect, and the fixing portions to which the vehicle mounted object is fixed may be disposed at the upper side of the space 32. In such a modified example, the vehicle rear side corresponds to "one side in the vehicle longitudinal direction" that is recited in the first aspect of the present invention, the second aspect of the present invention, and the third aspect of the present invention, and the vehicle front side corresponds to "another side in the vehicle longitudinal direction" that is recited in the first aspect of the present invention, the second aspect of the present invention, and the third aspect of the present invention.

Further, as a modified example of the above-described embodiments, a structure can also be employed in which the first leg portion of the bracket is provided with a vertical wall portion that is formed along a perpendicular direction, instead of the first vertical wall portion. Further, as a modified example of the above-described embodiments, a structure can also be employed in which the second vertical wall portion of the second leg portion at the bracket has a perpendicular end surface that is formed along a perpendicular direction, instead of the second end surface.

Further, as a modified example of the above-described embodiments, for example, a structure can also be employed in which the first vertical wall portion of the first leg portion is inclined toward the vehicle transverse direction inner side while heading toward the vehicle body floor side (one side in the vehicle vertical direction) as seen in a vehicle front view, and the first mounting portion of the first leg portion extends so as to be inclined toward the vehicle transverse direction inner side while heading toward one side in the vehicle longitudinal direction (the vehicle front side in the first through fourth embodiments) as seen in a vehicle plan view.

Further, as a modified example of the above-described embodiments, a structure can also be employed in which the second fastening point, that is furthest toward the vehicle rear side among the fastening points of the second mounting portion (46B, 48B, 78B) and the rear side member (14), is set at a vehicle longitudinal direction position that is equivalent to the fastening point (c) of the top wall portion (42) and the HV battery (38), or at a position that is slightly further toward the vehicle front side (one side in the vehicle longitudinal direction) than the fastening point (c) of the top wall portion (42) and the HV battery (38).

Further, as a modified example of the above-described first, third and fourth embodiments, one of the respective plate thicknesses of the first structural member 40A, 72A and the second structural member 40B, 72B may be set to be thicker than the other.

Further, as a modified example of the above-described first through third embodiments, a patch (plate) may be disposed on the vehicle body floor at a range that spans over the front and rear flange portions of the rear cross member and may be welded to the vehicle body floor and the rear cross member, and the first leg portion may be fixed to the rear cross member via the aforementioned patch (plate). In this case, the mounting portion of the first leg portion to the rear cross member can be disposed at the transverse direction (the vehicle longitudinal direction) central portion of the rear cross member.

Further, as a modified example of the above-described first through third embodiments, a patch (plate) may be disposed on the vehicle body floor at a range that spans over the left and right flange portions of the rear side member and may be welded to the vehicle body floor and the rear side member, and the second leg portion may be fixed to the rear side member via the aforementioned patch (plate). In this case, the mounting portion of the second leg portion to the rear side member can be disposed at the transverse direction (the vehicle transverse direction) central portion of the rear side member.

Further, the number of fastening points of the bracket and the rear cross member, and the number of fastening points of the bracket and the rear side member, are not limited to the examples of the above-described embodiments. Further, the respective places of fastening may be fastened by another fastening structure, such as weld bolts and nuts being applied or the like, instead of bolts and weld nuts.

Further, although the vehicle mounted object is made to be the HV battery 38 in the above-described embodiments, the vehicle mounted object may be another vehicle mounted object such as, for example, a fuel tank or the like.

Note that the above-described embodiments and the above-described plural modified examples can be implemented by being combined appropriately.

Although examples of the present invention have been described above, the present invention is not limited to the above, and can of course be implemented by being modified in various ways other than the above, within a scope that does not depart from the gist thereof.

Note that the disclosure of Japanese Patent Application No. 2013-198543 is, in its entirety, incorporated by reference into the present specification.

The invention claimed is:

1. A vehicle rear portion structure comprising:
   a pair of left and right rear side members that extend along a vehicle longitudinal direction at both sides of a vehicle body rear portion;
   a rear cross member that connects the pair of left and right rear side members and extends along a vehicle transverse direction; and
   brackets that have a fixing portion to which a vehicle mounted object is fixed, a first leg portion that extends from the fixing portion toward one side in a vehicle vertical direction and is fixed to the rear cross member, and a second leg portion that extends from the fixing portion toward the one side in the vehicle vertical direction and is fixed to the rear side member, and
   wherein the first leg portion comprises:
   a first mounting portion that is fixed to the rear cross member; and
   a first vertical wall portion that connects the first mounting portion and the fixing portion, and the second leg portion comprises:
a second mounting portion that is fixed to the rear side member; and
a second vertical wall portion that connects the second mounting portion and the fixing portion, and
a first end surface at one side in the vehicle longitudinal direction at the first vertical wall portion, and a second end surface at another side in the vehicle longitudinal direction at the second vertical wall portion, are inclined in directions of moving away from one another while heading toward the one side in the vehicle vertical direction as seen in a vehicle side view.

2. The vehicle rear portion structure of claim 1 comprising:
a first fastening point of the first leg portion and the rear cross member, at further toward one side in the vehicle longitudinal direction than a fastening point of the fixing portion and the vehicle mounted object, and
a second fastening point of the second leg portion and the rear side member, at further toward another side in the vehicle longitudinal direction than the fastening point of the fixing portion and the vehicle mounted object.

3. A vehicle rear portion structure comprising:
a pair of left and right rear side members that extend along a vehicle longitudinal direction at both sides of a vehicle body rear portion;
a rear cross member that connects the pair of left and right rear side members and extends along a vehicle transverse direction;
brackets that have a fixing portion to which a vehicle mounted object is fixed, a first leg portion that extends from the fixing portion toward one side in a vehicle vertical direction and is fixed to the rear cross member, and a second leg portion that extends from the fixing portion toward the one side in the vehicle vertical direction and is fixed to the rear side member,
a first fastening point of the first leg portion and the rear cross member, at further toward one side in the vehicle longitudinal direction than a fastening point of the fixing portion and the vehicle mounted object, and
a second fastening point of the second leg portion and the rear side member, at further toward another side in the vehicle longitudinal direction than the fastening point of the fixing portion and the vehicle mounted object.

* * * * *